United States Patent
Gidel et al.

(10) Patent No.: US 11,035,937 B2
(45) Date of Patent: Jun. 15, 2021

(54) INTRINSIC STATIC NOISE CHARACTERIZATION AND REMOVAL

(71) Applicant: LEDDARTECH INC., Quebec (CA)

(72) Inventors: Samuel Gidel, Quebec (CA); Vincent Simard-Bilodeau, Quebec (CA)

(73) Assignee: LEDDARTECH INC., Quebec (CA)

( * ) Notice: Subject to any disclaimer, the term of this patent is extended or adjusted under 35 U.S.C. 154(b) by 263 days.

(21) Appl. No.: 16/066,404

(22) PCT Filed: Dec. 22, 2016

(86) PCT No.: PCT/IB2016/057957
§ 371 (c)(1),
(2) Date: Jun. 27, 2018

(87) PCT Pub. No.: WO2017/115247
PCT Pub. Date: Jul. 6, 2017

(65) Prior Publication Data
US 2019/0011543 A1   Jan. 10, 2019

Related U.S. Application Data

(60) Provisional application No. 62/271,727, filed on Dec. 28, 2015.

(51) Int. Cl.
*G01S 7/497* (2006.01)
*G01S 17/02* (2020.01)
(Continued)

(52) U.S. Cl.
CPC ............ *G01S 7/497* (2013.01); *G01C 3/08* (2013.01); *G01S 7/4876* (2013.01);
(Continued)

(58) Field of Classification Search
CPC ...... G01S 7/4876; G01S 17/04; G01S 7/4913; G01S 17/10; G01S 7/497; G01C 3/08
(Continued)

(56) References Cited

U.S. PATENT DOCUMENTS

2006/0164533 A1* 7/2006 Hsieh ............... H04N 5/2353
348/317
2008/0317477 A1* 12/2008 Lin .................. G01S 7/4876
398/202
(Continued)

*Primary Examiner* — Daniel L Murphy
(74) *Attorney, Agent, or Firm* — Blueshift IP, LLC; Robert Plotkin

(57) ABSTRACT

A computer-implemented method and a system for at least partially removing intrinsic static noise from data obtained by an optical time-of-flight sensor using full-waveform analysis. The method includes receiving a plurality of calibration traces, the calibration traces being obtained in a controlled environment wherein no object is present in a field of view of the optical time-of-flight sensor; determining a noise template using the calibration traces by performing a statistical analysis on the calibration traces to determine a shape and an amplitude of the intrinsic static noise in the calibration traces; receiving a normal operation trace, the normal operation trace being obtained in an uncontrolled environment wherein a presence of the object in the field of view is unknown; subtracting the noise template from the normal operation trace, obtaining and outputting a denoised signal.

13 Claims, 12 Drawing Sheets

(51) Int. Cl.
G01S 17/10 (2020.01)
G01S 7/487 (2006.01)
G01S 17/04 (2020.01)
G01C 3/08 (2006.01)
G01S 7/4913 (2020.01)

(52) U.S. Cl.
CPC ............ G01S 7/4913 (2013.01); G01S 17/04 (2020.01); G01S 17/10 (2013.01)

(58) Field of Classification Search
USPC ........................................................ 356/5.01
See application file for complete search history.

(56) References Cited

U.S. PATENT DOCUMENTS

2012/0154786 A1 6/2012 Gosch
2015/0378013 A1 12/2015 Bikumandla

* cited by examiner

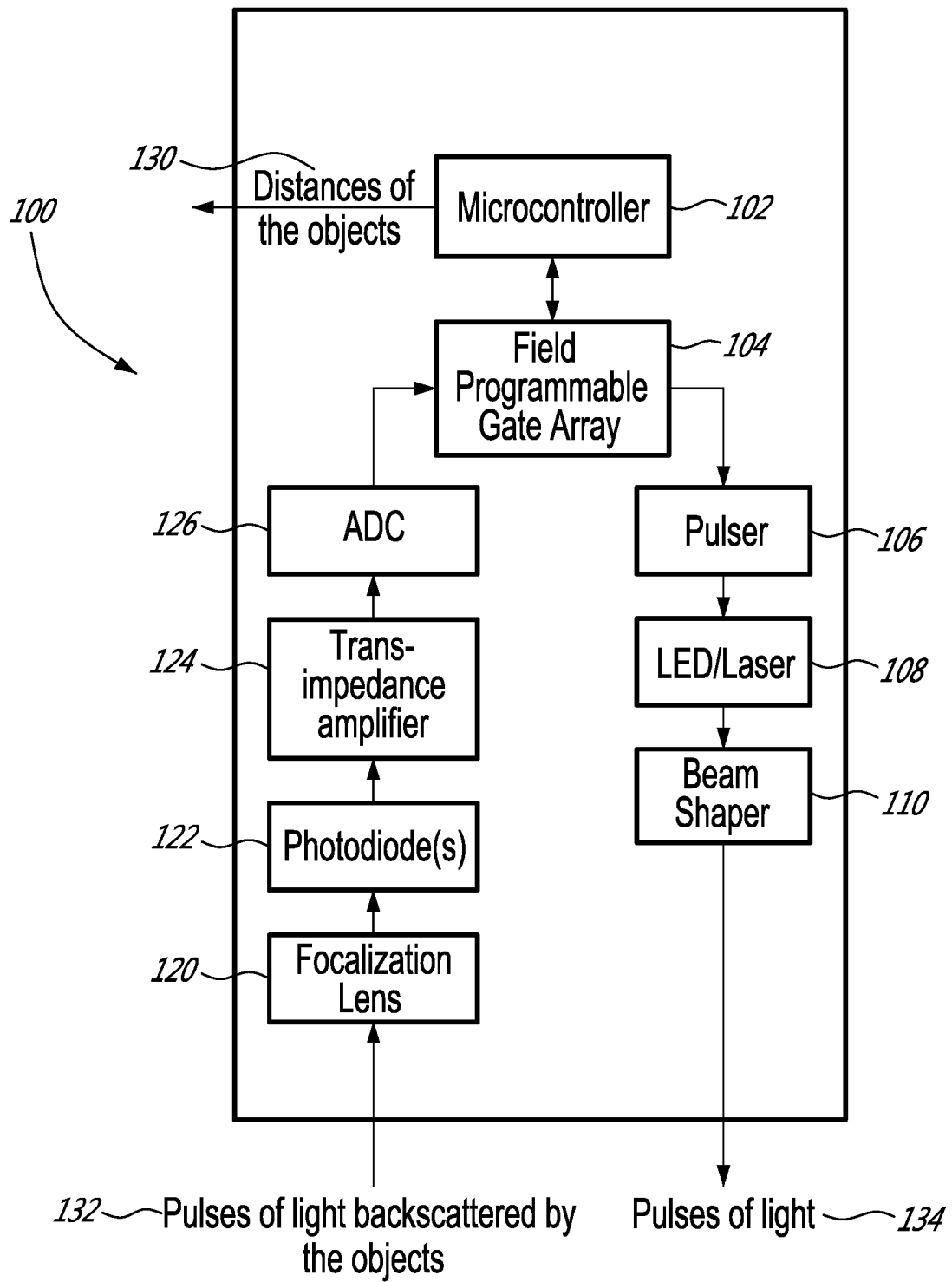

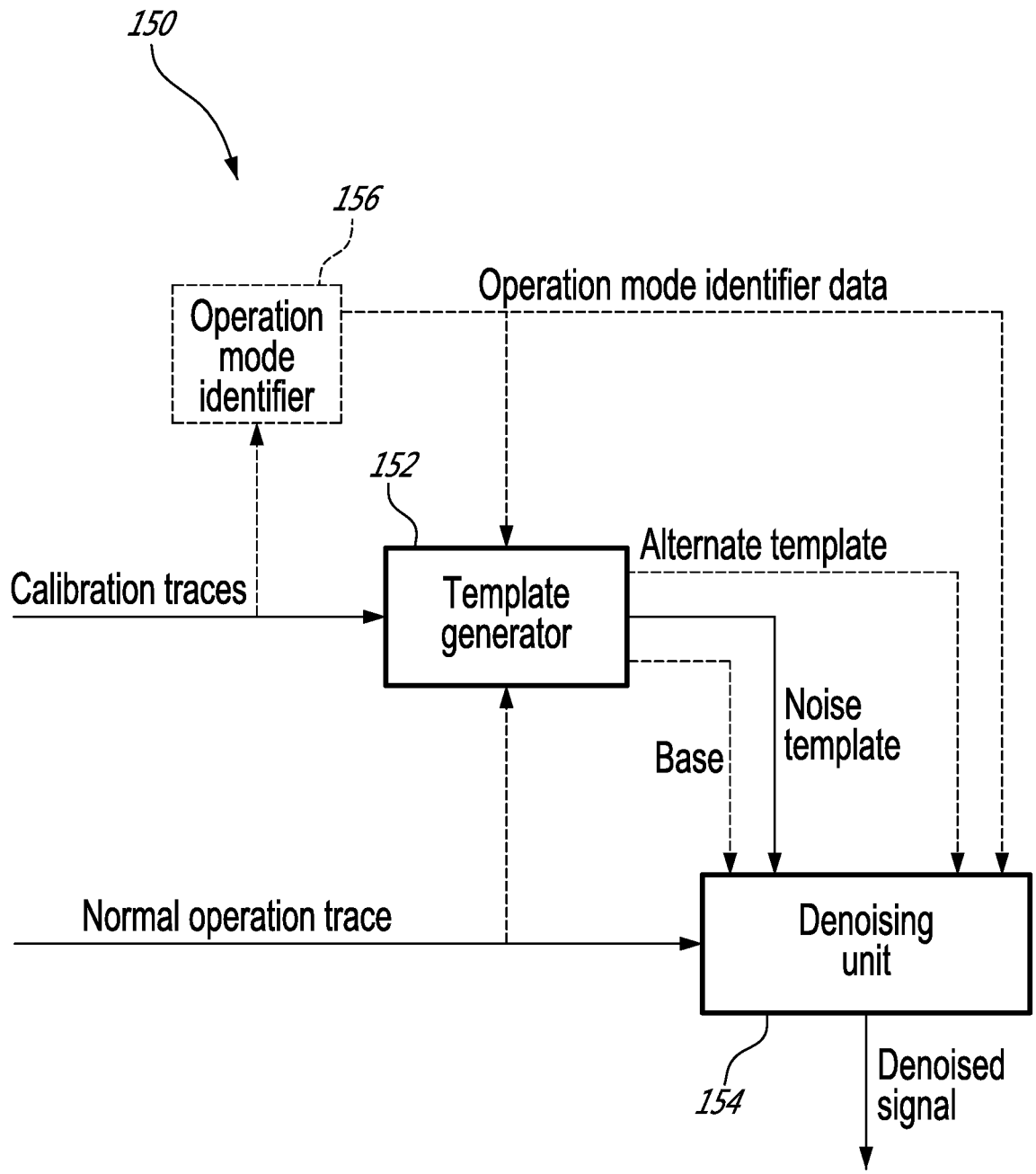

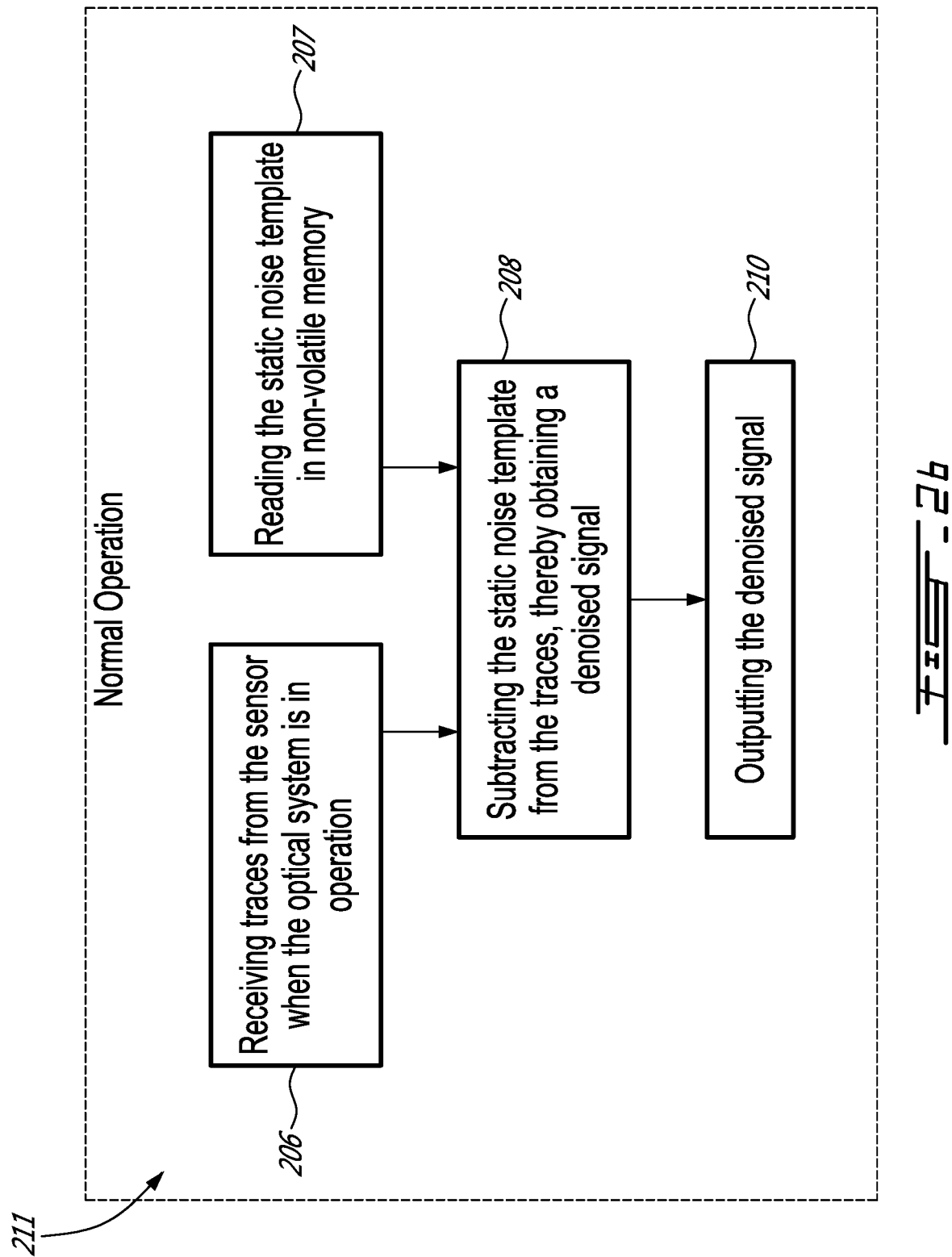

INTRINSIC STATIC NOISE CHARACTERIZATION AND REMOVAL

TECHNICAL FIELD

The present invention relates to the field of intrinsic static noise characterization and removal, more particularly in the context of time-of-flight sensors using full-waveform signals.

BACKGROUND OF THE ART

Prior art optical range-finding sensors comprise a light source adapted to emit light pulses of short duration. Each emitted light pulse that is backscattered by the objects in the environment of the sensor is captured by a sensor comprising one or an array of photodiodes. The signal generated by each photodiode is amplified and digitalized, resulting in a numerical signal. Each sample of the numerical signal corresponds to the intensity of the backscattered light at a specific time. This numerical signal is often called full-waveform signal or trace. Knowing the speed of light and the point in time at which the light pulse has been emitted, it is possible to relate each sample of the trace to a distance. The intensity peaks present in the trace correspond to objects in the scene and the positions of the intensity peaks in the trace correspond to the distances between the sensor and the objects.

Crosstalk reduction in optical time-of-flight systems is crucial for obtaining accurate measurements. In such systems, crosstalk may be caused by electrical or optical issues. Electrical crosstalk is usually caused by an undesirable Electro-Magnetic Field (EMF) generated by a source contaminating the signal of the photodiode. Optical crosstalk is usually caused by the effects of undesirable refraction and/or reflection of the light emitted by the optical range-finding sensor on the photodiode elements.

Some approaches have been attempted to reduce the crosstalk effect using hardware methods such as electrical isolation techniques (shielding) and/or circuit configurations (such as component placement that minimizes the crosstalk). However, electrical isolation is usually complex to implement due to numerous factors such as the characteristics of the photodiode or the signal frequency. Others approaches propose minimizing the crosstalk by software methods based on digitalization of the photodiode signal. These approaches leave a non-negligible amount of noise in the outputted signals.

Therefore, there is a need for a method and system for characterizing and/or attenuating/removing crosstalk for time-of-flight sensors using full-waveform analysis.

SUMMARY

Computer implemented methods and systems are described herein for at least partially removing intrinsic static noise for a time-of-flight optical sensor using full-waveform analysis. The intrinsic static noise is induced by the electronic and/or optical design of the optical system. Intrinsic static noise can significantly degrade the distance measurement accuracy of the sensor.

In summary, a computer-implemented method and a system for at least partially removing intrinsic static noise from data obtained by an optical time-of-flight sensor using full-waveform analysis are described. The method includes receiving a plurality of calibration traces, the calibration traces being obtained in a controlled environment wherein no object is present in a field of view of the optical time-of-flight sensor; determining a noise template using the calibration traces by performing a statistical analysis on the calibration traces to determine a shape and an amplitude of the intrinsic static noise in the calibration traces; receiving a normal operation trace, the normal operation trace being obtained in an uncontrolled environment wherein a presence of the object in the field of view is unknown; subtracting the noise template from the normal operation trace, obtaining and outputting a denoised signal.

According to one broad aspect of the present invention, there is provided a computer-implemented method for at least partially removing intrinsic static noise from data obtained by an optical time-of-flight sensor using full-waveform analysis, the intrinsic static noise being caused by electrical and/or optical interference produced by components of the optical time-of-flight sensor. The computer-implemented method comprises use of at least one processing unit for: receiving a plurality of calibration traces from the optical time-of-flight sensor, the calibration traces being obtained in a controlled environment wherein no object is present in a field of view of the optical time-of-flight sensor; determining a noise template using the calibration traces by performing a statistical analysis on the calibration traces to determine a shape and an amplitude of the intrinsic static noise in the calibration traces; receiving a normal operation trace from the optical time-of-flight sensor, the normal operation trace being obtained in an uncontrolled environment wherein a presence of the object in the field of view is unknown; subtracting the noise template from the normal operation trace, thereby obtaining a denoised signal; and outputting the denoised signal.

In one embodiment, in the controlled environment, the field of view of the optical time-of-flight sensor is obstructed to prevent light from being incident on the optical time-of-flight sensor.

In one embodiment, the statistical analysis includes modeling the intrinsic static noise by a series of Gaussian functions representing a mean and a variance of each sample of the calibration traces.

In one embodiment, the method further comprises determining a base of the noise template and adjusting the denoised signal using the base.

In one embodiment, the method further comprises comparing the normal operation trace to the noise template to determine that no object is present in the uncontrolled environment during a reference time period; updating the noise template using the normal operation trace.

In one embodiment, the intrinsic static noise varies according to an operation mode of the optical time-of-flight sensor. The method further comprises receiving a plurality of alternate calibration traces, the alternate calibration traces being obtained in an alternate environment, wherein the optical time-of-flight sensor is in an alternate operation mode and wherein no object is present in the field of view of the optical time-of-flight sensor; carrying out the step of determining the noise template to determine an alternate noise template using the alternate calibration traces; receiving an indication that the sensor is in the alternate operation mode in the uncontrolled environment; subtracting the alternate noise template from the normal operation trace, thereby obtaining a denoised alternate signal.

In one embodiment, the step of receiving a plurality of calibration frames comprises receiving the calibration frames successively.

In one embodiment, the calibration frames are received during a predetermined period of time.

In one embodiment, the step of determining the base of the modelled static noise template comprises determining the base of the modelled static noise template using a linear regression method.

In one embodiment, the linear regression method is the least square method.

According to another broad aspect of the present invention, there is provided a system for at least partially removing intrinsic static noise from data obtained by an optical time-of-flight sensor using full-waveform analysis, the intrinsic static noise being caused by electrical and/or optical interference produced by components of the optical time-of-flight sensor. The system comprises a template generator for receiving a plurality of calibration traces from the optical time-of-flight sensor, the calibration traces being obtained in a controlled environment wherein no object is present in a field of view of the optical time-of-flight sensor; and determining a noise template using the calibration traces by performing a statistical analysis on the calibration traces to determine a shape and an amplitude of the intrinsic static noise in the calibration traces; a denoising unit for receiving a normal operation trace from the optical time-of-flight sensor, the normal operation trace being obtained in an uncontrolled environment wherein a presence of the object in the field of view is unknown; subtracting the noise template from the normal operation trace, thereby obtaining a denoised signal; and outputting the denoised signal; wherein the template generator and the denoising unit are provided by at least one processing unit.

In one embodiment, in the controlled environment, the field of view of the optical time-of-flight sensor is obstructed to prevent light from being incident on the optical time-of-flight sensor.

In one embodiment, the template generator is further adapted to model the intrinsic static noise by a series of Gaussian functions representing a mean and a variance of each sample of the calibration traces.

In one embodiment, the template generator is further adapted to determine a base of the noise template and wherein the denoising unit is further adapted to adjust the denoised signal using the base.

In one embodiment, the template generator is further adapted to compare the normal operation trace to the noise template to determine that no object is present in the uncontrolled environment during a reference time period; update the noise template using the normal operation trace.

In one embodiment, the intrinsic static noise varies according to an operation mode of the optical time-of-flight sensor. The system further comprises an operation mode identifier for providing operation mode identifier data, the operation mode identifier data including an indication that the sensor is in the alternate operation mode in the uncontrolled environment. In this embodiment, the template generator is adapted for receiving a plurality of alternate calibration traces, the alternate calibration traces being obtained in an alternate environment, wherein the optical time-of-flight sensor is in the alternate operation mode and wherein no object is present in the field of view of the optical time-of-flight sensor and carrying out the step of determining the noise template to determine an alternate noise template using the alternate calibration traces. In this embodiment, the denoising unit is adapted for receiving the indication that the sensor is in the alternate operation mode in the uncontrolled environment; and subtracting the alternate noise template from the normal operation trace, thereby obtaining a denoised alternate signal.

In one embodiment, the template generator is configured for receiving the calibration frames successively.

In one embodiment, the template generator is configured for receiving the calibration frames during a predetermined period of time.

In one embodiment, the template generator is configured for determining the base of the modelled noise template using a linear regression method.

In one embodiment, the linear regression method is the least square method.

BRIEF DESCRIPTION OF THE DRAWINGS

Further features and advantages of the present invention will become apparent from the following detailed description, taken in combination with the appended drawings, in which:

FIG. 1 includes FIG. 1a and FIG. 1b in which FIG. 1a is a block diagram illustrating an optical time-of-flight sensor using full-waveform analysis and FIG. 1b is a block diagram of main components of a system for at least partly removing intrinsic static noise from full-waveform traces obtained using an optical time-of-flight sensor of the type of FIG. 1a;

FIG. 12 includes FIG. 12a and FIG. 12b in which

FIG. 13 includes FIG. 13a and FIG. 13b in which

DETAILED DESCRIPTION

Figure 2A:
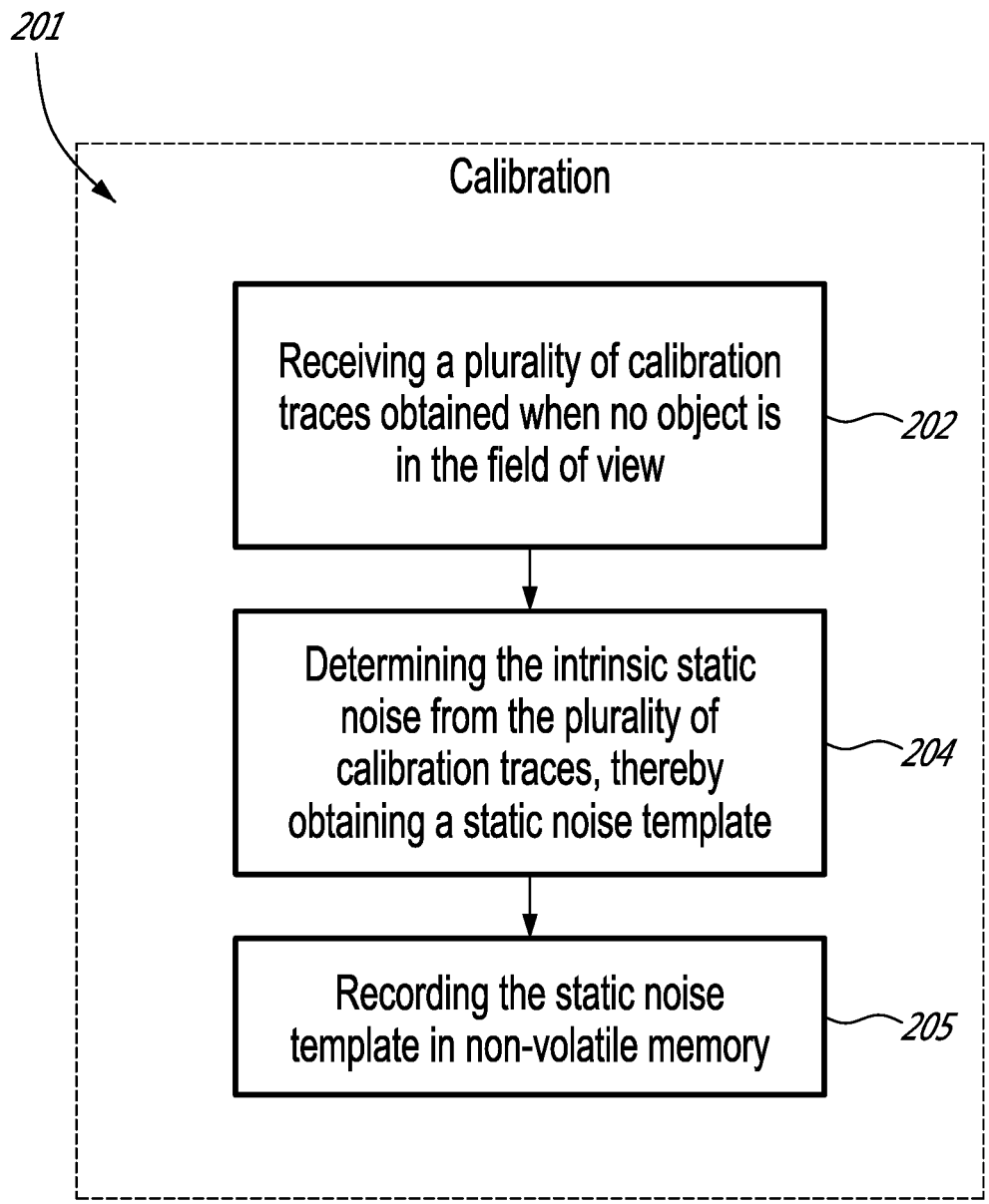
FIG. 2 includes FIG. 2a and FIG. 2b which are flow charts illustrating a combined method for removing at least partially intrinsic static noise that affects an optical system comprising a time-of-flight sensor using full-waveform analysis, in accordance with an example embodiment.

The Signal-to-Noise Ratio (SNR) of a time-of-flight sensor using full-waveform analysis is representative of its measurement accuracy and precision. Two main types of noise can have a negative impact on the SNR: the static noise and the random noise. Both of these causes the deterioration of the SNR.

"Static noise" is the name given to a particular noise pattern in the photodiode signal which has a specific shape. The shape of the static noise can be time variant or time invariant. It can also depend on the operating conditions of the sensor. In the case of an optical system using full-waveform analysis, the static noise creates systematic errors on distance measurements of objects which may be lesser or greater than the correct value. The static noise typically degrades the accuracy of the sensor.

"Random noise" is the term given to a random fluctuation in the trace. The random noise is due to different sources of noise such as thermal noise, dark noise, shot noise and ambient light. Contrary to the static noise, the random noise has a zero mean. This random noise variance may be attenuated using a simple low-pass filter or by averaging several traces of the same scene. In the case of an optical system based on full-waveform analysis, the random noise creates random errors on the distance measurements of objects. The random noise typically degrades the precision of the device.

In the context of signal processing for an optical system using full-waveform analysis, distinguishing the noise from the useful signal may be an issue. In the present description, the problems of identifying, characterizing, and compensating or attenuating the static noise in order to improve the measurement accuracy are addressed.

The static noise is usually caused by electromagnetic fields (EMFs) produced by multiple electronic sources, by light contaminations generated from multiple reflections and by refraction of the light emitted by the sensor. Two types of static noise can be distinguished, namely the intrinsic static noise and the extrinsic static noise.

The intrinsic static noise is caused by the electronic and/or optical design of the optical system which includes, for example, at least one optical emitter, such as a Light Emitting Diode (LED), and an optical sensor, such as photodiode(s). More precisely, the intrinsic static noise can be produced by electrical and/or optical interferences captured by the circuit amplifying the signal from the photodiode element(s). The intrinsic static noise creates artefacts in the trace of the sensor. The intrinsic static noise may be caused by devices such as transient power components or switching power suppliers. The intrinsic static noise is substantially constant for a given operating condition of the devices. The shape and the magnitude of the intrinsic static noise is independent of the object in the scene and it can be characterized during calibration of the sensor. For example, the EMF generated by the electronics of a light pulser is captured by the electronics of a photodiode amplifier and creates artifacts in the photodiode signal. Intrinsic noise can be also observed when pulsed light is partially backscattered by a glass installed in front of the sensor in order to protect it against environmental conditions. This backscattered light is then captured by the photodiode and it creates undesired peaks in the trace.

The present characterization and attenuation/removal methods are to be applied in relation with an optical time-of-flight sensor 100 using full-waveform analysis which is illustrated in FIG. 1a. For the emission of pulses of light 134, the following steps occur. A pulser 106 pulses an LED/Laser light source 108 at a substantially constant rate. A beam shaper 110 shapes the light beam emitted by the LED/Laser light source 108 in order to obtain a desired sensor field of emission.

A portion of the pulses of light 134 sent into a detection zone is reflected back towards the sensor 100 as backscattered pulses 132. A focalization lens 120 focalizes the signal backscattered by objects present in the detection zone on the photo-sensitive surface of the photodiode 122. The focalization lens 120 is usually designed to match the sensor field of emission. Photodiode 122 converts the received photons into an electrical current. A Trans-Impedance Amplifier (TIA) 124 converts the variations of the electrical current passing through the photodiode 122 into a voltage. An Analog to Digital Converter (ADC) 126 converts the voltage outputted by the TIA 124 into a discrete number signal.

A Field Programmable Gate Array (FPGA) 104 controls the pulser 106 as well as the acquisition of the photodiode signal from the ADC 126. The generated pulses of light 134 are synchronized with the signal acquisition mechanism. It implements the oversampling and the accumulation principles which maximize the received Signal-to-Noise Ratio and increase the sampling resolution. Example processing aspects carried out by the signal acquisition mechanism and processor are described in U.S. Pat. No. 7,640,122, the contents of which is hereby incorporated by reference. The acquired signal is called a "trace". A trace is a sequence of ADC samples. The value of each sample corresponds to the amount of LED/Laser light, also called count, received by the photodiode at a given time. The shape of the trace is determined by the shape, the distance and the reflectivity of the objects backscattering the light emitted by the sensor. The trace is actually a sum of the object reflections in the sensor field of emission. The peaks in the trace correspond to the reflections induced by the objects in the sensor field of emission. The reflections induced by the objects located close to the sensor will appear earlier in the trace while the reflections due to a further object will appear later.

A microcontroller 102 synchronizes the operation of the components of the system. It also implements the signal processing algorithm that performs the static noise reduction and detects peaks in the trace in order to provide the distance of the detected objects 130.

The intrinsic static noise attenuation/removal method comprises two main steps. The first step consists in determining the shape and amplitude of the intrinsic static noise, which may be seen as a calibration step. This calibration step is conducted in a controlled environment wherein no object is present in the field of view of the sensor and only the intrinsic static noise is observed in the traces. For example, the field of view of the sensor may be obstructed so that no light is captured by the sensor photodiode while the sensor 100 is operated in the usual way. The traces outputted by the sensor, referred to as calibration traces, correspond to the intrinsic static noise. The shape and amplitude of the intrinsic static noise, called template, is stored in memory.

The second step consists in subtracting the static noise template from the traces when the sensor 100 is in normal operation that is when the sensor is operated in an uncontrolled environment where objects can appear at any unknown location and any unknown time in the sensor field of view.

The shape of the static noise is subject to change as the electronic components decay over time. Therefore, in one embodiment, the method further comprises a step of updating the intrinsic static noise template scheme during the normal operation of the system. This additional step takes place at a time when there is no object in the trace (or subpart of the trace) to measure the static noise and update the template, in case of change.

FIG. 2 illustrates one embodiment of a computer-implemented combined method for determining static noise affecting an optical system comprising a time-of-flight sensor using full-waveform analysis. The combined method includes calibration method 201 shown in FIG. 2a and normal operation method 211 shown in FIG. 2b. Methods 201 and 211 are implemented by a computer machine comprising at least a communication means for receiving and transmitting data, at least one processing unit, and a memory for storing statements and/or instructions which upon execution by the processing unit perform the steps of methods 201 and 211. For example, methods 201 and 211 may be performed by a data/signal processor, such as microcontroller 102.

At step 202, the processing unit is used for receiving a plurality of calibration traces which are obtained when no object is in the field of view of the sensor. At step 204, the processing unit is used for determining an intrinsic static noise template representing the intrinsic static noise from the plurality of calibration traces, as described below. At step 205, the static noise template is stored in non-volatile memory. Steps 202, 204 and 205 correspond to the calibration method 201. At step 206, the processing unit is used for receiving traces from the sensor when it is in normal operation, such as when objects are in the field of view of the sensor and the field of view of the sensor is not obstructed. At step 207, the noise template is read from the non-volatile memory. At step 208, the processing unit is used for subtracting the intrinsic static noise template from the trace, thereby obtaining a denoised signal. At step 210, the processing unit is used for outputting the denoised traces which may be stored in memory or used in additional processing steps. Steps 206, 207, 208 and 210 illustrate the operation of the intrinsic noise attenuation/removal method when the sensor is used in normal operation 211.

Calibration Method

Since the intrinsic static noise is not random and is constant from trace to trace, it can be substantially removed from the sensor traces. The process which consists in learning a static error in the traces is called calibration.

If more than one static noise source is present, calibration may involve creating more than one template and subtracting each of them from the traces during normal operation of the sensor. In an embodiment in which the different sources contributing to the intrinsic static noise are always present, a single noise template representing the sum of different noise sources is stored. In an embodiment in which the different sources contributing to the intrinsic static noise are not always present, for example in cases where the intrinsic static noise varies depending on the operation mode of the sensor, several noise templates each representing a different operation mode can be stored. In this latter case, the operation mode is observed during operation in order to compensate for it when need be. Example operation modes include a variety of voltages at which the LED light sources can be driven for the detection of objects, the presence/absence of a protective window on the casing of the sensor, etc. A template corresponding to each operation mode can be created and updated and can be subtracted from the sensor traces as long as the operation mode is identified during normal operation of the sensor.

Figure 3:
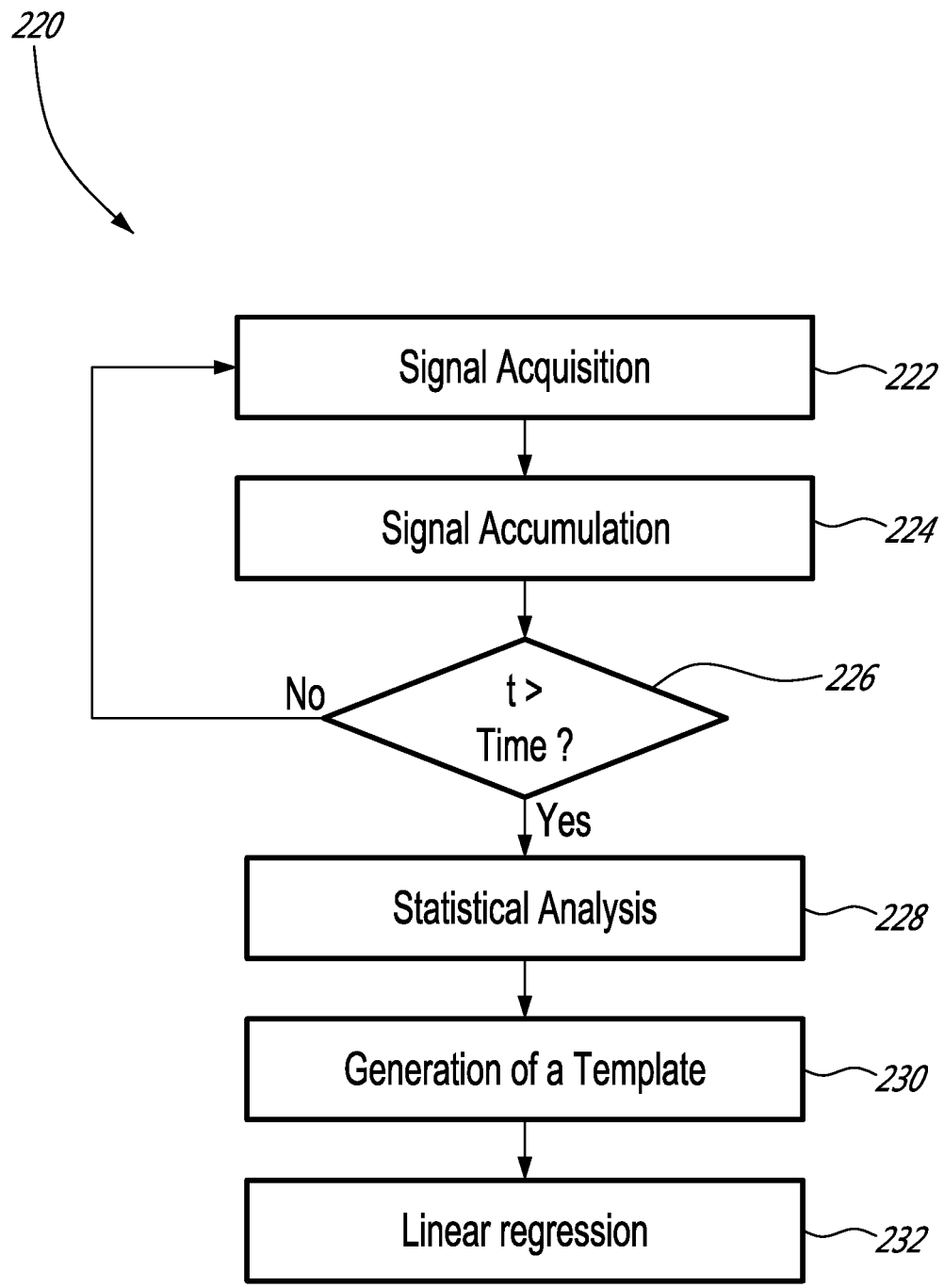
FIG. 3 is a flow chart illustrating a method for determining an intrinsic noise template from calibration traces, in accordance with an example embodiment.

In one embodiment, the goal of the calibration method is to achieve a statistically reliable measurement procedure for the noise properties of the traces. FIG. 3 illustrates one embodiment of a reliable measurement method 220 for the calibration method 201. Step 222 corresponds to the signal acquisition wherein calibration traces are successively received. The signal acquisition starts at time t=0. Step 224 corresponds to the signal accumulation during which the successively received calibration traces are stored in a memory such as a buffer. At step 226, the time elapsed since the beginning of the method 220 is calculated and compared to a reference time period. The calibration traces are accumulated until the elapsed time is equal to or greater than the reference period of time in order to ensure that a predetermined number of calibration traces are accumulated. When the elapsed time is greater than the reference period of time, a statistical analysis is performed on the accumulated calibration traces at step 228. The statistical analysis of the calibration traces is then used for generating a noise template at step 230, as described below. Finally, the noise template offset, also called base, is computed using linear regression at step 232, as described below.

Figure 4:
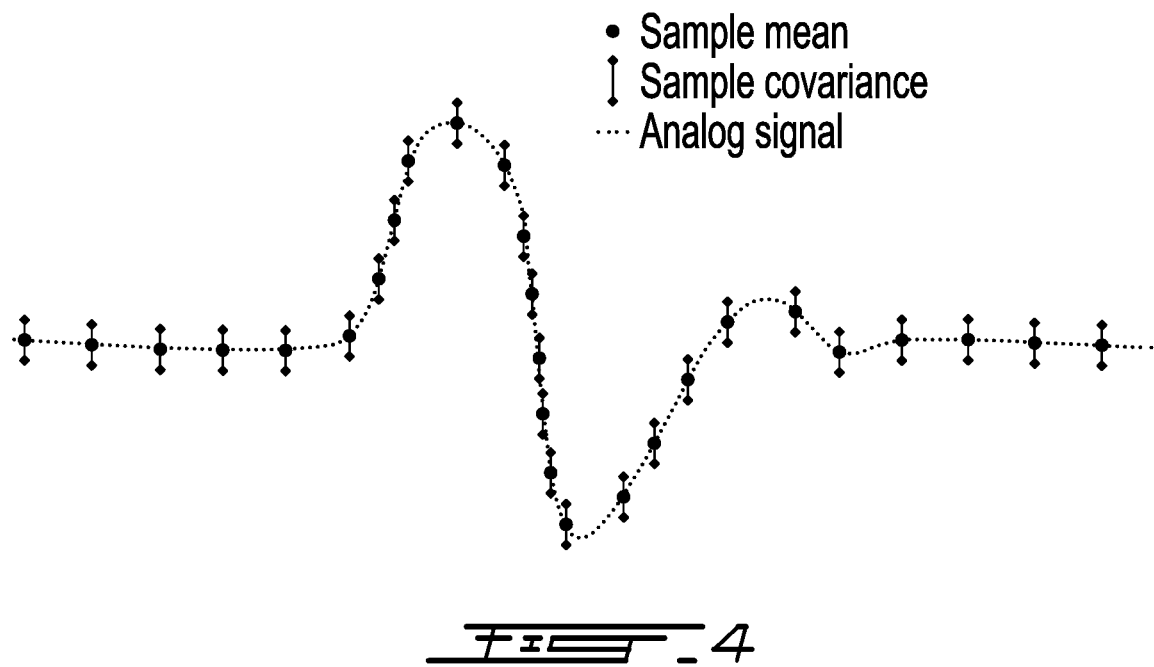
FIG. 4 is an exemplary graph illustrating an intrinsic static noise template.

In one embodiment, the shape and the magnitude of the intrinsic static noise is modeled by a series of Gaussian functions representing the mean and variance of each sample of the calibration traces as illustrated in FIG. 4. The intrinsic static noise template is denoted $T_k$ and mathematically defined as:

$$T_k = N(\mu_k, \sigma_k) \qquad \text{Eq. 1}$$

In order to determine the statistical parameters of each sample, the calibration method is divided into two sub-functions, namely the signal learning sub-function that accumulates a plurality of calibration traces in order to calculate the Gaussian parameters of each sample of the template and the template base determination sub-function that removes the template offset such that it varies around zero.

The learning signal sub-function accumulates, in a buffer, each sample of the calibration traces that has an amplitude lower than a predefined threshold. This threshold may be set below the signal saturation level. The amplitude value of a saturated sample is truncated at the maximum input voltage of the ADC which could introduce a bias in the characterization of the static noise. The static noise is normally far from the saturation level. This sub-function uses Gaussian equations to calculate the mean and the variance of each sample. In this case, the variance represents the uncertainty on each sample which will be useful during the update step, while the mean is used to remove or at least attenuate the intrinsic static noise during normal operation of the sensor. The means of the template samples are given by:

$$\mu_k = \frac{1}{N} \sum_{i=1}^{N} \tilde{s}_k(i) \qquad \text{Eq. 2}$$

where $\mu_k$ is the mean of the $k^{th}$ sample of the template, $\tilde{s}_k(i)$ is the $k^{th}$ sample of $i^{th}$ calibration trace, and N is the number of calibration traces. The variances of the template samples are given by:

$$\sigma_k^2 = \frac{1}{N} \sum_{i=1}^{N} (\tilde{s}_k(i) - \mu_k)^2 \qquad \text{Eq. 3}$$

where $\sigma_k^2$ is the variance of the $k^{th}$ sample.

In order to remove the static noise in the traces once the sensor is in normal operation, the base of the static noise template is evaluated. In the case where the signal has a negative portion, the base of the signal is located at the center of the ADC range. For example, an ADC with a resolution of 8 bits encodes an analog signal using 256 ($2^8$) levels. Each sample value ranges between 0 and 255 and the center of the range is 128. Consequently, the values higher than 128 are positive while values below 128 is negative. In other words, the base of the static noise template corresponds to the shape of the trace without noise and when there is no object in the field-of-view of the sensor. Due to the manufacturing tolerance of the electronic components, the bases of the traces may not be perfectly centered at the middle of the range of the ADC. In addition, due to the non-linear behavior of the photodiode, the base can vary from one sample to the next. One can model the base of the static noise template using the following linear equation:

$$b_k = p + m \cdot k \qquad \text{Eq. 4}$$

where k is the sample index and $b_k$ is the base value of the $k^{th}$ sample. The slope of the base is m and p is its intercept (the value of $b_k$ when k=0).

Figure 5:
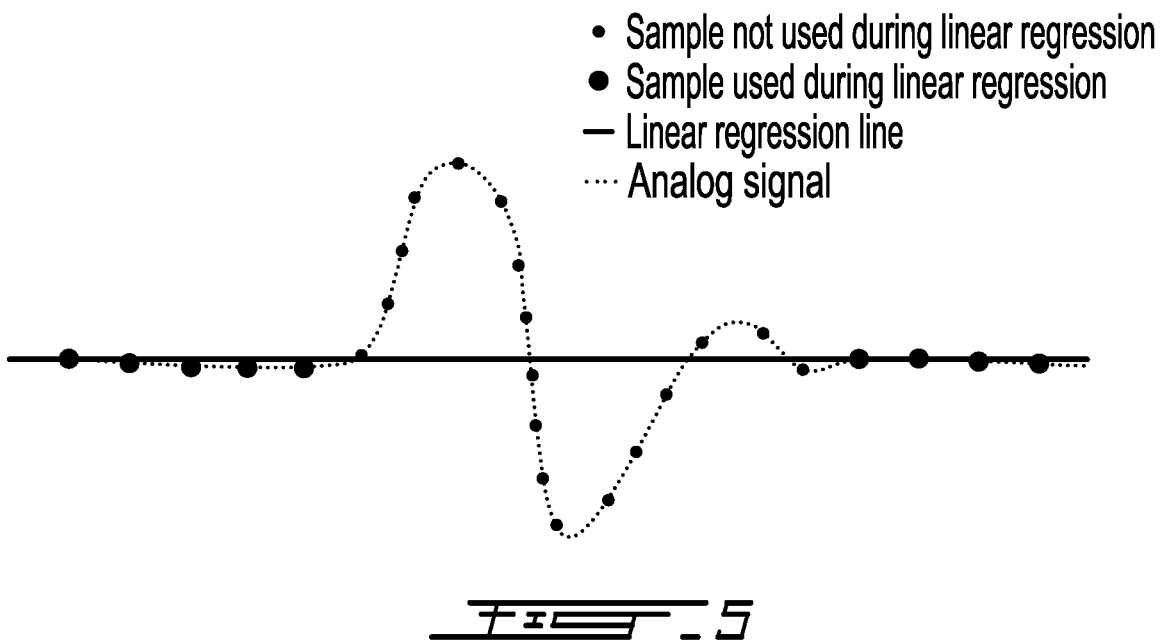
FIG. 5 is a graph of a linear regression performed on an intrinsic static noise template using the five first sample points and the four last sample points which are located outside the intrinsic static noise region of the calibration trace, in accordance with an example embodiment.

The linear regression method uses a predetermined number of samples located outside of the shape of the intrinsic static noise template. In other words, the samples are located in a region of the calibration trace where no intrinsic static noise is assumed to be present. Knowing the samples located inside the intrinsic static noise shape, a given number of samples located outside of the shape of the intrinsic static noise are used to calculate the best linear fit. FIG. 5 illustrates a linear-regression line obtained using the first five samples and the last four samples of an example template.

In one embodiment, the method for fitting a regression line is the least-square technique. The least-square technique generally provides better results in comparison to less advanced techniques. However, it should be understood that a less advanced technique for linear regression may be used. For example, the base can be determined by computing the linear equation that passes through the first sample and the last sample of the trace. In general, matrix representation is more compact and will be used in the following equations. However, the person skilled in the art will understand that the use of the matrix representation may be omitted. When matrix representation is used, Eq. 4 becomes:

$$U = JB \qquad \text{Eq. 5}$$

where $U = [\mu_1, \ldots, \mu_M, \mu_{E-M+1}, \mu_E]^T$ is a column matrix storing the M first and the M last samples of the template, E is the length of the trace, $B = [m, p]^T$ is a column matrix containing the parameters to be determined, m and p, and J is the design matrix defined as:

$$J = \begin{bmatrix} 1 & 1 \\ \vdots & \vdots \\ M & 1 \\ N-M+1 & 1 \\ \vdots & \vdots \\ N & 1 \end{bmatrix} \qquad \text{Eq. 6}$$

In the present case, there are more equations than unknown parameters. Equation 5 can be solved in the least square sense as shown below:

$$B = J^+ U \qquad \text{Eq. 7}$$

where $J^+$ is the pseudo inverse such that:

$$J^+ = (J^T J)^{-1} J^T \qquad \text{Eq. 8}$$

Vector B corresponds to the parameters of the static noise base. By subtracting this base $b_k$ from the sample mean $\mu_k$ of the template $T_k$, the signal $o_k$ is obtained.

$$o_k = \mu_k - b_k \qquad \text{Eq. 9}$$

Operation Method

Figure 6:
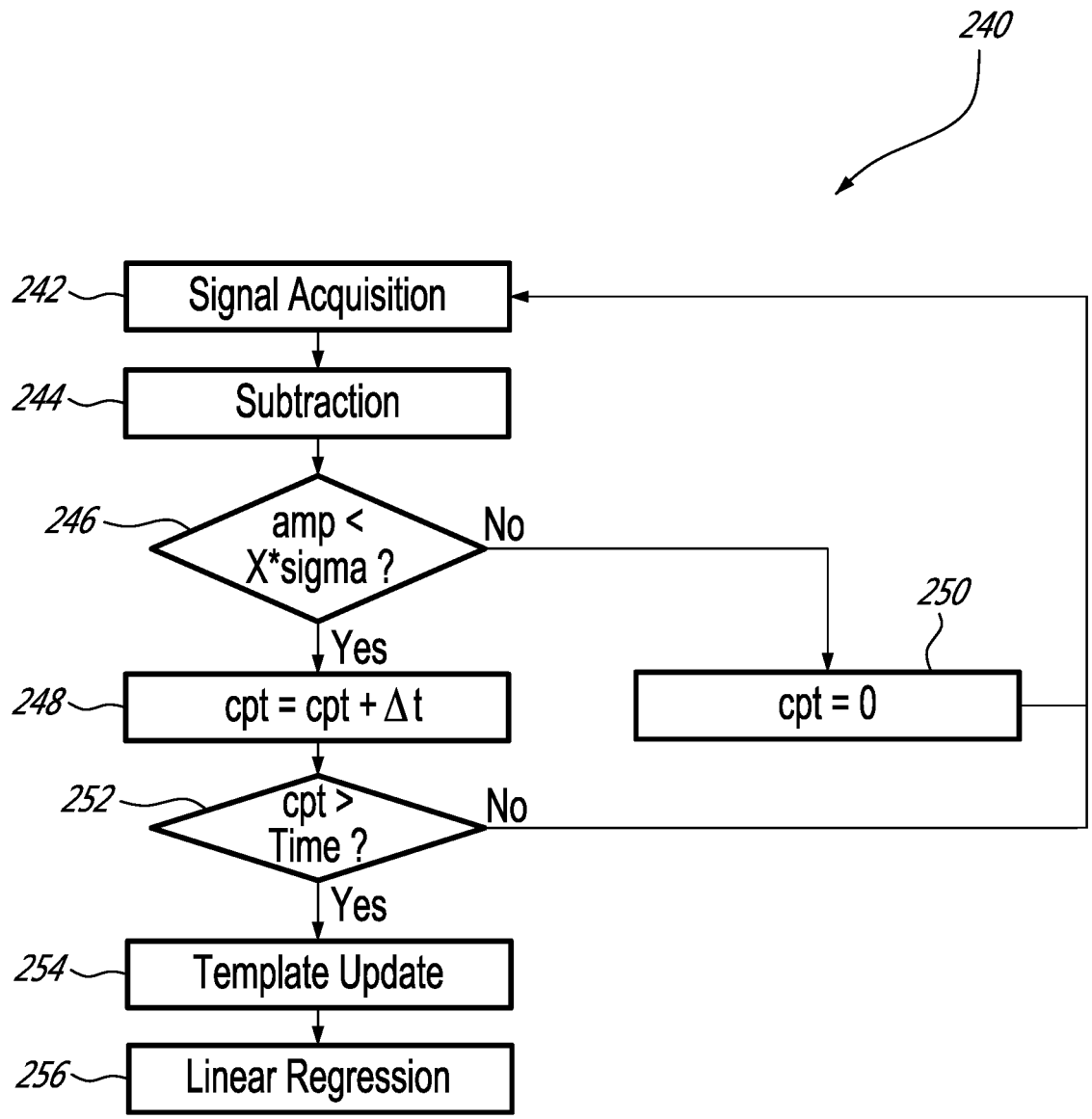
FIG. 6 is a flow chart illustrating a method for subtracting an intrinsic static noise and updating a noise template, in accordance with an example embodiment.

FIG. 6 illustrates one embodiment of a method 240 for subtracting the intrinsic static noise and updating the noise template. Step 242 corresponds to the signal acquisition, namely the acquisition of the traces when the optical system is in normal operation. At step 244, the static noise templates are retrieved from memory and subtracted from the traces. At step 246, the amplitude differences between the template and the trace samples are compared to a threshold which may depend on the standard deviation of the samples of the template $\sigma_k$. For example, the threshold may be set to X times the standard deviation. If the amplitude difference of a given sample is greater than the threshold, it means that the sensor detects an object (or any other artifact that does not have the shape of the intrinsic static noise) in the neighborhood of the sample. Therefore, the sample cannot be used to update the static noise template (at step 254) and the variable count (cpt) is reset to zero at step 250. If the amplitude difference is less than the threshold, then the variable count cpt is incremented by a period corresponding to the trace acquisition period at step 248. The variable count cpt is compared to a reference time period (several seconds, for example) at step 252. If the elapsed time is less than the reference period of time, then the template $T_k$ is not updated (at step 254) and the method returns to step 242 for signal acquisition. Otherwise, the template and the base of the template are updated at steps 254 and 256 respectively. This ensures that the modification remains present long enough in the trace to conclude that it is a low-rate change of the static noise.

Figure 7:
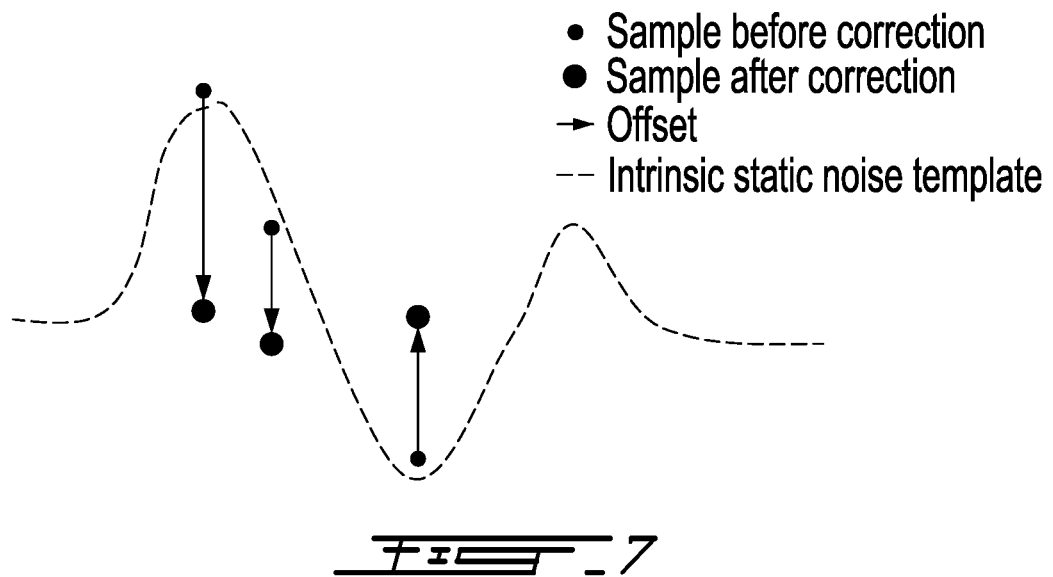
FIG. 7 illustrates the removal of intrinsic static noise during a cleaning step, in accordance with an example embodiment.

The clean signal shape $\bar{s}_k$ is calculated by subtracting the signal $o_k$ from the measured signal $\tilde{s}_k$:

$$\bar{s}_k = \tilde{s}_k - o_k \qquad \text{Eq. 10}$$

where $\bar{s}_k$ is the $k^{th}$ sample of the clean signal, $\tilde{s}_k$ is the measured trace and $o_k$ is the offset between the base and each sample of the template $T_k$. FIG. 7 illustrates how each sample is repositioned near the signal base after the subtraction of intrinsic static noise.

The manufacturing tolerances and the level of voltage delivered to the light source is taken into account by the calibration method during the manufacturing of the sensor. However, numerous environmental factors including the temperature, the humidity and the aging of the circuit components may vary. These factors have an impact on the shape of the static noise. It may be appropriate to add a process to estimate the shape of the static noise during the operation of the sensor. Doing so, the accuracy of the sensor will be maintained over time and under varying operating conditions.

The update process of the static noise template $T_k$ can be seen as a classification problem. In fact, the algorithm determines which samples of the trace $s_k$ belong to the intrinsic static noise. In other words, it determines whether a sample value contains only the contribution of the static noise value ($w_0$) or also contains information ($w_1$) that cannot be used to estimate the shape the static noise during operation. In order to do so, the standard deviation of the template $T_k$ may be used to decide if each sample $s_k$ is part of class $w_0$ or $w_1$:

$$w_0 = \{\tilde{s}_k : |\tilde{s}_k - \mu_k| < X \cdot \sigma_k\} \qquad \text{Eq. 11}$$

where $X \cdot \sigma_k$ represents ±X*standard deviation of the value located in $T_k$.

The template update process ensures that the old values are replaced by new ones if the modification represents a permanent change of the static intrinsic noise and not punctual noise. Replacement of the old values is carried out after a number of traces or after a given period of time (about a few seconds, for example). The oldest values are then replaced by the new ones.

Figure 8:
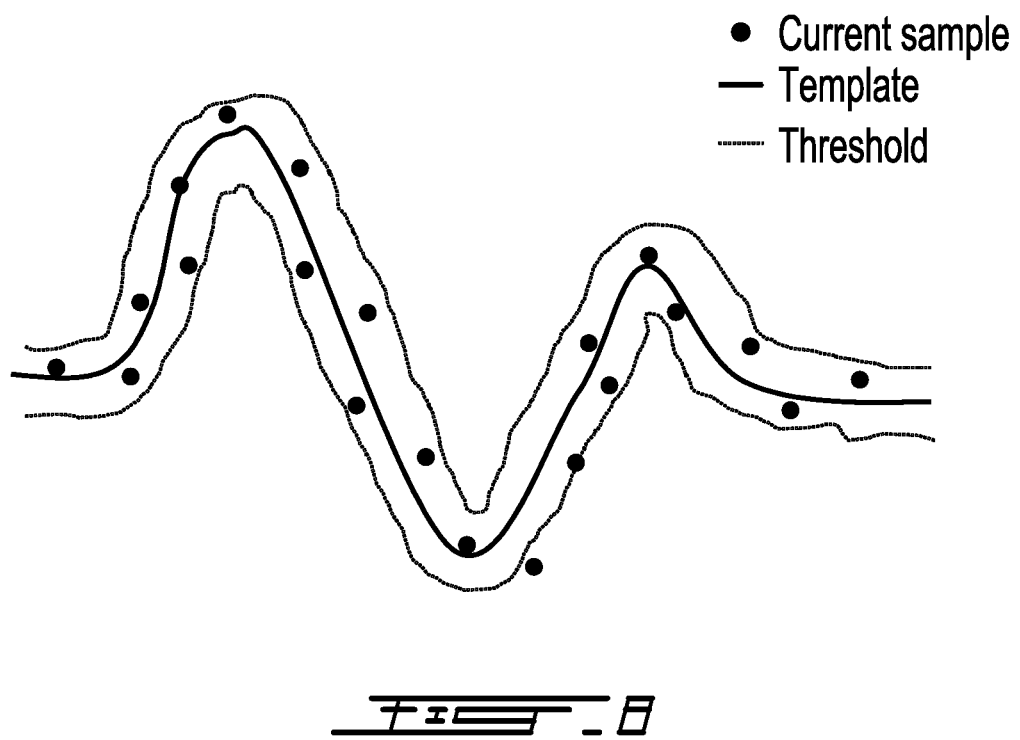
FIG. 8 illustrates sample positions according to statistics computed for the intrinsic static noise template, in which a single sample is outside and is not to be used during an update step, in accordance with an example embodiment.

In one embodiment, the update of the template is performed when the measurement is located within ±X*standard deviation of the reference value for a given elapsed time. FIG. 8 is an example representation in which all measurements are used during the update except for one. The reference measurement is updated using the following equation:

$$\mu_k = (1-\alpha) \cdot \mu_k + \alpha \cdot \tilde{s}_k \qquad \text{Eq. 12}$$

where $\alpha$ is a weighting constant between 0 and 1, $\tilde{s}_k$ is the trace acquired during the operation of the sensor and $\mu_k$ is the value of the $k^{th}$ sample of the template.

In one embodiment, the above-described computer-implemented methods are embodied as a system, as illustrated in FIG. 1b. The system 150 includes a template generator 152 for receiving a plurality of calibration traces from the optical time-of-flight sensor and determining a noise template and a denoising unit 154 for receiving a normal operation trace from the optical time-of-flight sensor, the normal operation trace being obtained during normal operation of the optical time-of-flight sensor, subtracting the noise template from the normal operation trace, obtaining a denoised signal and outputting the denoised signal. The template generator 152 may optionally determine a base which is used by the denoising unit 154.

In one embodiment, the template generator 152 and the denoising unit 154 are each provided with a respective processing unit configured for executing their respective method steps, a respective memory, and respective communication means. In another embodiment, the template generator 152 and the denoising unit 154 share a same processing unit, a same memory, and a same communication means.

In one embodiment, the template generator 152 is further adapted to compare the normal operation trace to the noise template to determine that no object is present in the uncontrolled environment during a reference time period and update the noise template using the normal operation trace.

In one embodiment, the intrinsic static noise varies according to an operation mode of the optical time-of-flight sensor. An operation mode identifier 156 provides operation mode identifier data, the operation mode identifier data including an indication that the sensor is in the alternate operation mode in the uncontrolled environment. The template generator 152 is then adapted for receiving a plurality of alternate calibration traces, the alternate calibration traces being obtained in an alternate environment, wherein the optical time-of-flight sensor is in the alternate operation mode and wherein no object is present in the field of view of the optical time-of-flight sensor and carrying out the step of determining the noise template to determine an alternate noise template using the alternate calibration traces. The denoising unit 154 is then adapted for receiving the indication that the sensor is in the alternate operation mode in the uncontrolled environment; and subtracting the alternate noise template from the normal operation trace, thereby obtaining a denoised alternate signal.

EXAMPLE

The Light-Emitting Diode (LED) pulse noise phenomenon is caused by electromagnetic interference in the receiver electronics produced by the light pulser electronics. The receiver circuit is the victim and the pulser is the aggressor. The interference is created when a significant amount of energy is delivered from the pulser capacitor to the LEDs during a very short amount of time. By varying different parameters such as the pulse frequency, the voltage drop during the pulser capacitor discharge, the tolerances of the electronic components and the position between both aggressor and victim circuits, the shape of the signals contaminating the victims changes. In this example, it is assumed that the pulse frequency of the optical sensor as well as the distance between the pulser and the receiver are fixed.

Figure 9:
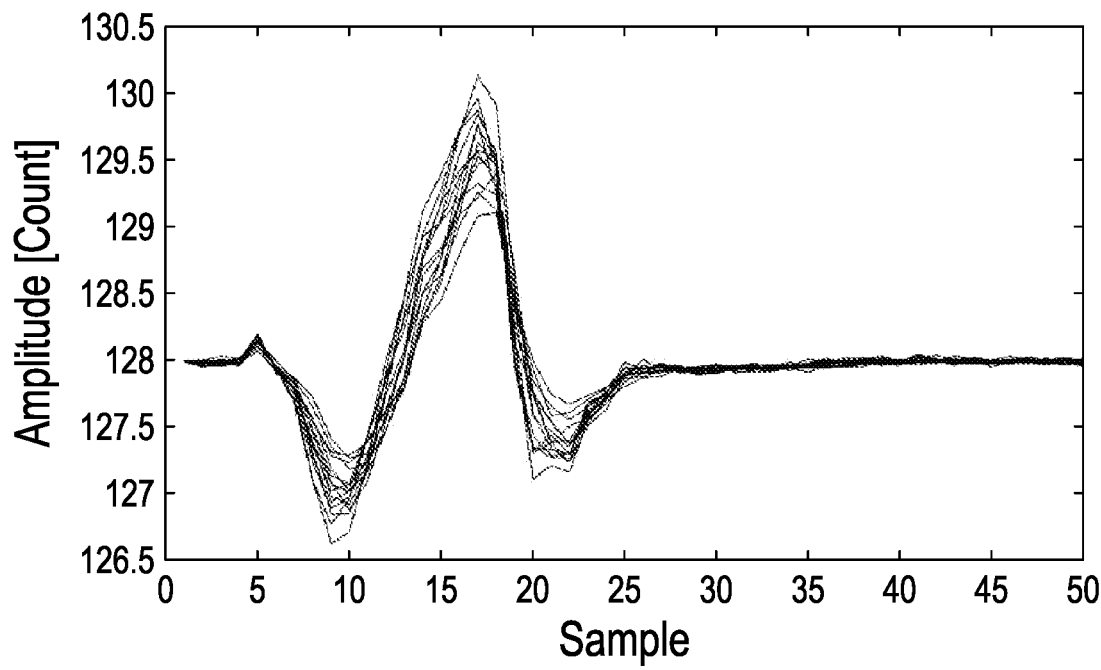
FIG. 9 is an exemplary graph illustrating crosstalk signals obtained from a plurality of sensors belonging to a same family due to manufacturing tolerance.

Each electronic component of the sensor has a manufacturing tolerance. The cost of the component is directly related to the rigidity of this manufacturing tolerance. When components are assembled into a system, the sum of their individual tolerances creates a total system tolerance. This total system tolerance explains why the intrinsic static noise observed in the photosensitive elements of the same family of sensors has a slightly different shape and magnitude as illustrated in FIG. 9.

Figure 10:
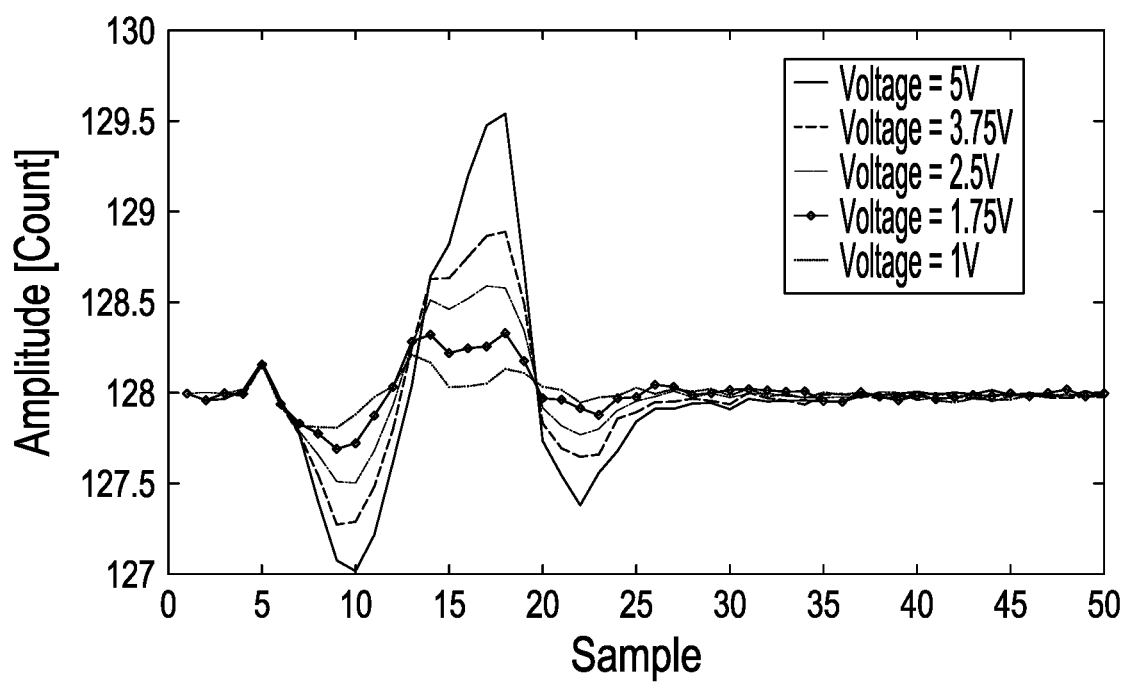
FIG. 10 is an exemplary graph showing the shape and the amplitude of crosstalk signals induced by the electric field generated by the pulser for different voltages delivered to a light emitting diode as a function of time.

The EMF are produced by electric charges in power cords, wires or other electronic components. The higher the voltage variation of these charges, the stronger the generated electric field, as illustrated in FIG. 10. This test confirms that the level of voltage delivered to the LEDs has an important impact on the shape and the amplitude of the static intrinsic noise. The higher the voltage of the pulser capacitors before there are discharged, the stronger the static pulse noise.

The results presented in the example below were obtained using a Galaxy™ sensor designed and manufactured by LeddarTech.

Figure 11:
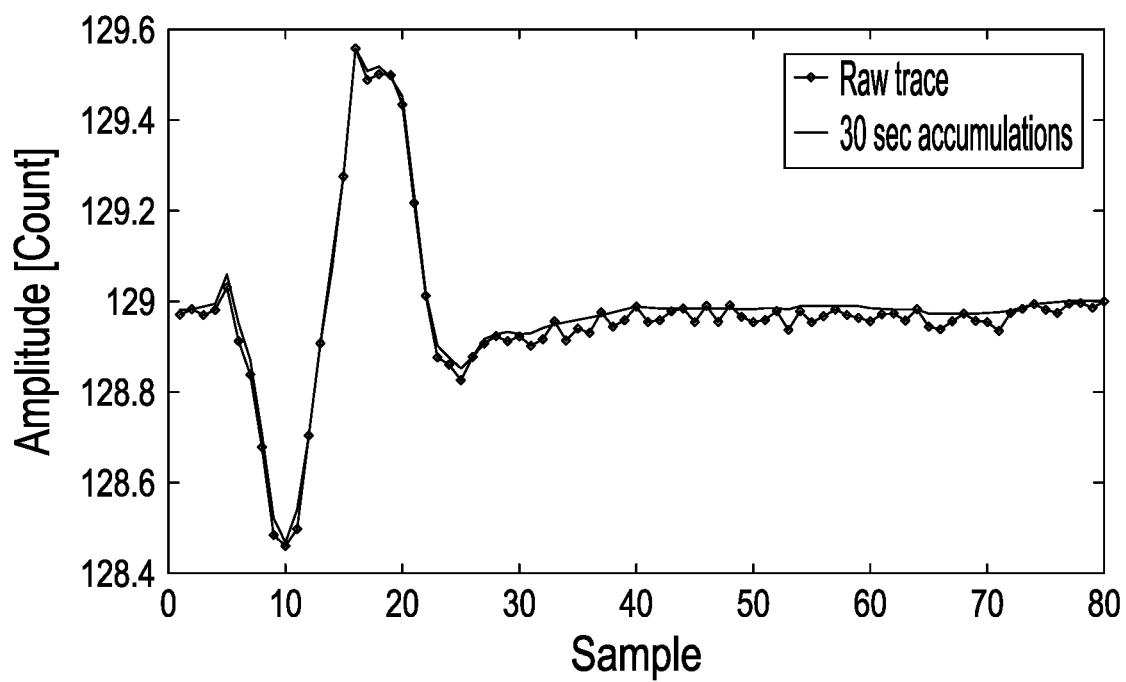
FIG. 11 illustrates a raw trace acquired by a photosensitive element and the average of traces acquired at 8.8 Hz during 30 s, in accordance with an example embodiment.

The signal learning step works with the raw traces and uses the method of signal averaging (or accumulation) described above, to increase the SNR of the waveforms corrupted with random noise. In the example of FIG. 11, the acquisition rate of the sensor is 8.8 Hz (8.8 traces per second). After an accumulation of 20 seconds, only the static pulse noise remains present.

A calibration from a generic template optimizes production time while a calibration from a unique template for each manufactured sensor increases the repeatability of the performance.

Figure 12A:
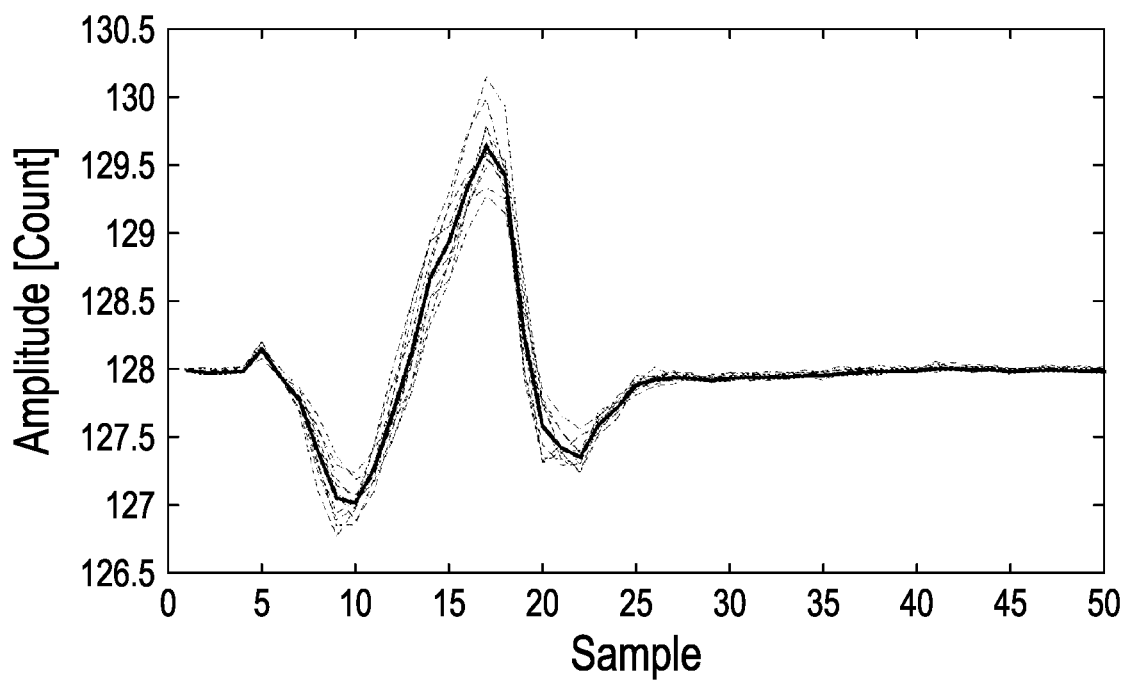
FIG. 12a is a graph illustrating a calibration with a generic template to reduce a sensor manufacturing time, in accordance with an example embodiment
Figure 12B:
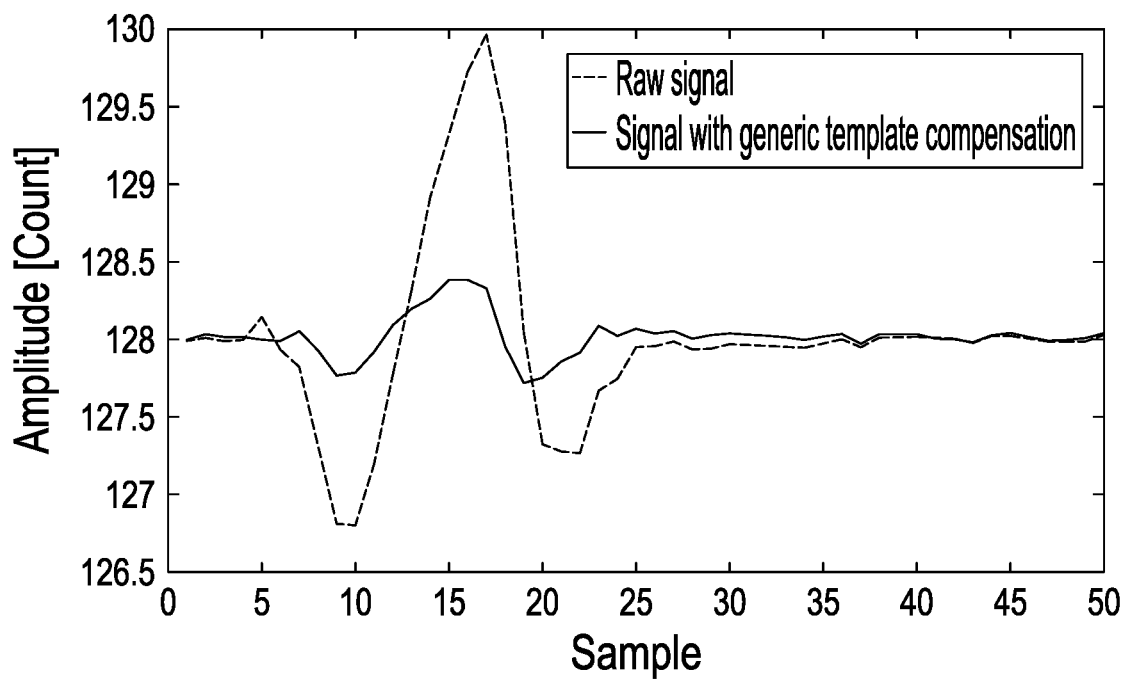
FIG. 12b is an exemplary graph illustrating a raw trace and the trace compensated using a generic template.

The calibration with a generic template, as illustrated in FIG. 12a, is one possible approach to decrease the production time. A generic template represents the average of several intrinsic static noise signals recorded independently on several photosensitive elements and/or several sensors. This template can be made an integral part of the sensor software code and no additional calibration is then required during the production step. This template may not be perfectly representative of the static noise signal for each photosensitive element of a given sensor. Some artefacts due to the intrinsic static noise may remain present in the trace of the victims. These remaining artifacts usually do not exceed 10% of the intrinsic static noise without compensation, as illustrated in FIG. 12b. The optional template update sub-function may help reduce the error or even cancel the error during operation of the sensor.

Figure 13A:
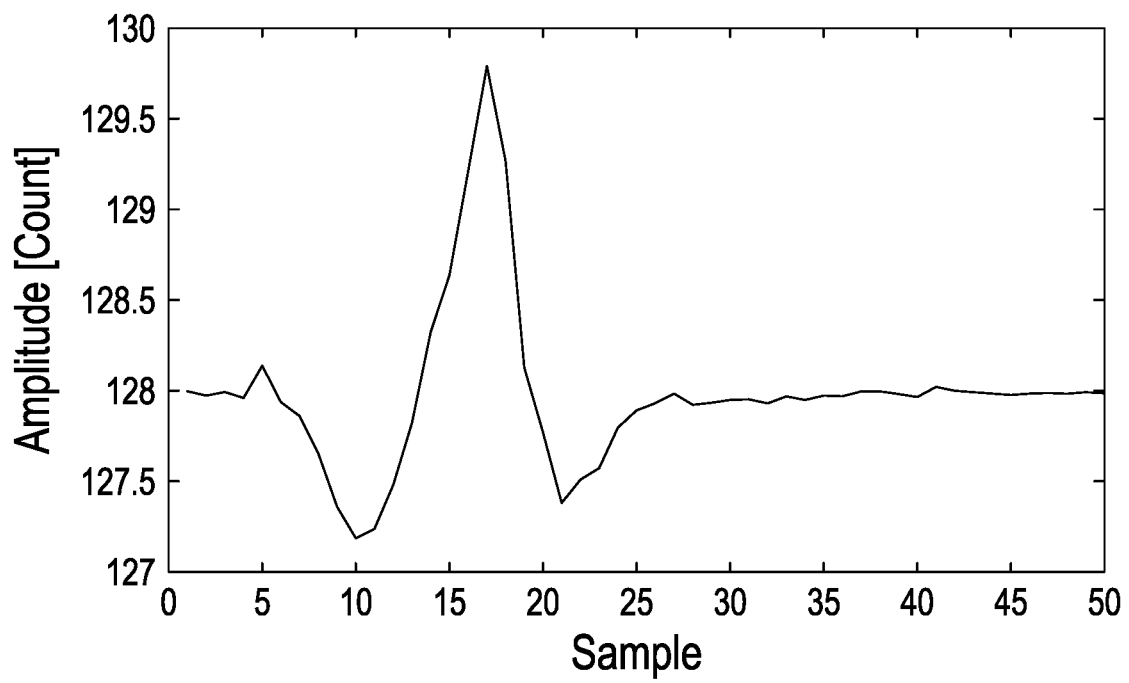
FIG. 13a is a graph illustrating a calibration with a unique template to reduce a residual error, in accordance with an example embodiment
Figure 13B:
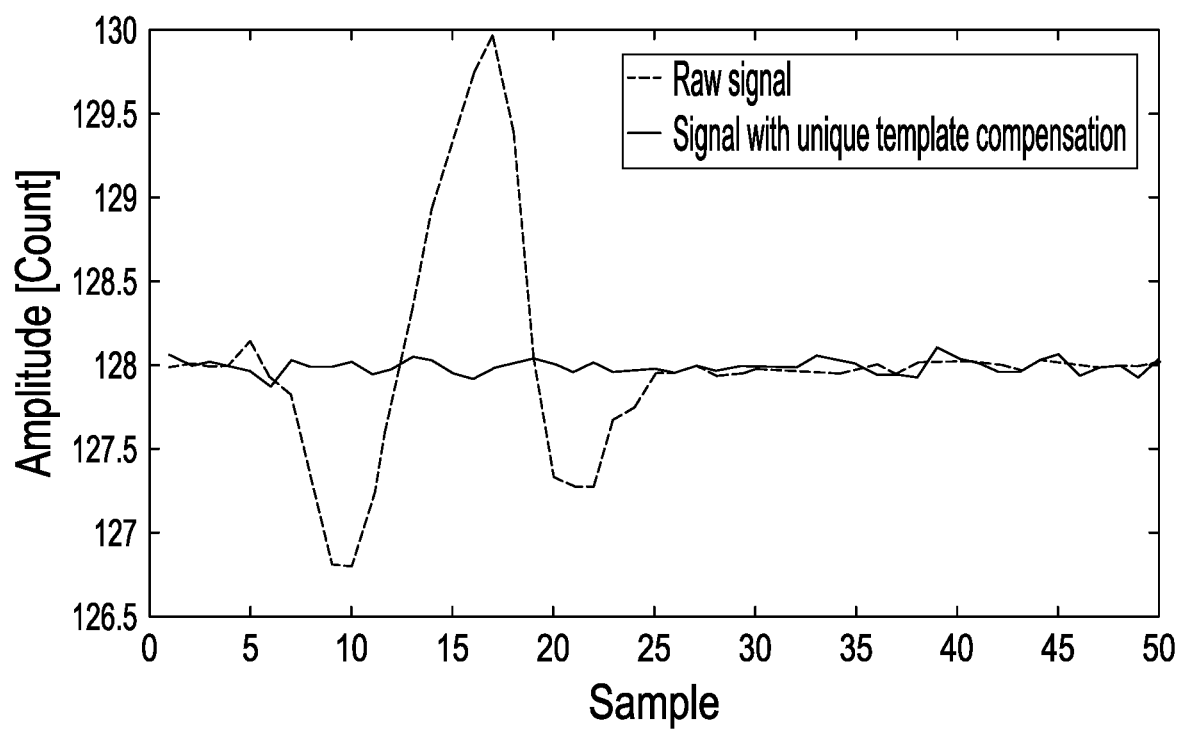
FIG. 13b is an exemplary graph illustrating a raw trace and the trace compensated using a unique template; and It will be noted that throughout the appended drawings, like features are identified by like reference numerals.

The calibration with a unique template, an example of which is illustrated in FIG. 13a, represents an approach to decrease the residual error. A unique template generated for each sensor requires an additional step during the manufacturing of the sensor to learn the intrinsic static noise unique to each component. A unique template represents the average of several intrinsic static noise traces recorded on the same sensor. As this template is very close to the exact shape of the intrinsic static noise, the residual error is almost null, as illustrated in FIG. 13b.

Independently of the type of template, namely a generic template or a unique template, five different templates each corresponding to a respective level of voltage applied to the LEDs are used in this example. In one embodiment and in order to increase the accuracy of the detections, the intrinsic static noise is updated regularly during operation of the sensor to take into account the varying temperature conditions and the aging of electronic components.

The embodiments described above are intended to be exemplary only. The scope of the invention is therefore intended to be limited solely by the scope of the appended claims.

The invention claimed is:

1. A computer-implemented method for at least partially removing intrinsic static noise from data obtained by an optical time-of-flight sensor using full-waveform analysis, said intrinsic static noise being caused by electrical and/or optical interference produced by components of the optical time-of-flight sensor, said computer-implemented method comprising use of at least one processing unit for:
   receiving a plurality of calibration full-waveform traces from the optical time-of-flight sensor, the calibration full-waveform traces being obtained in a controlled environment wherein no object is present in a field of view of the optical time-of-flight sensor;
   determining a noise template using the calibration full-waveform traces by performing a statistical analysis on the calibration full-waveform traces to determine a shape and an amplitude of said intrinsic static noise in said calibration full-waveform traces;
   receiving a normal operation full-waveform trace from the optical time-of-flight sensor, the normal operation full-waveform trace being obtained in an uncontrolled environment wherein a presence of said object in said field of view is unknown;
   subtracting the noise template from the normal operation full-waveform trace, thereby obtaining a denoised signal; and
   outputting the denoised signal.

2. The computer-implemented method of claim 1, wherein in said controlled environment, the field of view of the optical time-of-flight sensor is obstructed to prevent light from being incident on the optical time-of-flight sensor.

3. The computer-implemented method of claim 1, wherein said statistical analysis includes modeling said intrinsic static noise by a series of Gaussian functions representing a mean and a variance of each sample of the calibration full-waveform traces.

4. The computer-implemented method of claim 1, further comprising determining a base of said noise template and adjusting said denoised signal using said base.

5. The computer-implemented method of claim 1, further comprising:
   comparing said normal operation full-waveform trace to said noise template to determine that no object is present in said uncontrolled environment during a reference time period; and
   updating the noise template using said normal operation full-waveform trace.

6. The computer-implemented method of claim 1, wherein said intrinsic static noise varies according to an operation mode of said optical time-of-flight sensor, said method further comprising:
   receiving a plurality of alternate calibration full-waveform traces, said alternate calibration full-waveform traces being obtained in an alternate environment, wherein said optical time-of-flight sensor is in an alternate operation mode and wherein no object is present in said field of view of the optical time-of-flight sensor;
   carrying out said step of determining said noise template to determine an alternate noise template using said alternate calibration full-waveform traces;
   receiving an indication that said sensor is in said alternate operation mode in said uncontrolled environment; and
   subtracting the alternate noise template from the normal operation full-waveform trace, thereby obtaining a denoised alternate signal.

7. A system for at least partially removing intrinsic static noise from data obtained by an optical time-of-flight sensor using full-waveform analysis, said intrinsic static noise being caused by electrical and/or optical interference produced by components of the optical time-of-flight sensor, said system comprising:
   a template generator for:
      receiving a plurality of calibration full-waveform traces from the optical time-of-flight sensor, the calibration full-waveform traces being obtained in a controlled environment wherein no object is present in a field of view of the optical time-of-flight sensor; and
      determining a noise template using the calibration full-waveform traces by performing a statistical analysis on the calibration full-waveform traces to determine a shape and an amplitude of said intrinsic static noise in said calibration full-waveform traces; and
   a denoising unit for
      receiving a normal operation full-waveform trace from the optical time-of-flight sensor, the normal operation full-waveform trace being obtained in an uncontrolled environment wherein a presence of said object in said field of view is unknown;
      subtracting the noise template from the normal operation full-waveform trace, thereby obtaining a denoised signal; and
      outputting the denoised signal;
   wherein said template generator and said denoising unit are provided by at least one processing unit.

8. The system of claim 7, wherein in said controlled environment, the field of view of the optical time-of-flight sensor is obstructed to prevent light from being incident on the optical time-of-flight sensor.

9. The system of claim 7, wherein said template generator is further adapted to model said intrinsic static noise by a series of Gaussian functions representing a mean and a variance of each sample of the calibration full-waveform traces.

10. The system of claim 7, wherein said template generator is further adapted to determine a base of said noise template and wherein said denoising unit is further adapted to adjust said denoised signal using said base.

11. The system of claim 7, wherein said template generator is further adapted to
compare said normal operation full-waveform trace to said noise template to determine that no object is present in said uncontrolled environment during a reference time period; and
update the noise template using said normal operation full-waveform trace.

12. The system of claim 7, wherein said intrinsic static noise varies according to an operation mode of said optical time-of-flight sensor;
further comprising an operation mode identifier for
providing operation mode identifier data, said operation mode identifier data including an indication that said sensor is in said alternate operation mode in said uncontrolled environment;
wherein said template generator is adapted for
receiving a plurality of alternate calibration full-waveform traces, said alternate calibration full-waveform traces being obtained in an alternate environment, wherein said optical time-of-flight sensor is in said alternate operation mode and wherein no object is present in said field of view of the optical time-of-flight sensor; and
carrying out said step of determining said noise template to determine an alternate noise template using said alternate calibration full-waveform traces; and
wherein said denoising unit is adapted for
receiving said indication that said sensor is in said alternate operation mode in said uncontrolled environment; and
subtracting the alternate noise template from the normal operation full-waveform trace, thereby obtaining a denoised alternate signal.

13. A computer program product for at least partially removing intrinsic static noise from data obtained by an optical time-of-flight sensor using full-waveform analysis, said intrinsic static noise being caused by electrical and/or optical interference produced by components of the optical time-of-flight sensor, the computer program product comprising a computer readable memory storing computer executable instructions thereon that when executed by a processor perform the method steps of:
receiving a plurality of calibration full-waveform traces from the optical time-of-flight sensor, the calibration full-waveform traces being obtained in a controlled environment wherein no object is present in a field of view of the optical time-of-flight sensor;
determining a noise template using the calibration full-waveform traces by performing a statistical analysis on the calibration full-waveform traces to determine a shape and an amplitude of said intrinsic static noise in said calibration full-waveform traces;
receiving a normal operation full-waveform trace from the optical time-of-flight sensor, the normal operation full-waveform trace being obtained in an uncontrolled environment wherein a presence of said object in said field of view is unknown;
subtracting the noise template from the normal operation full-waveform trace, thereby obtaining a denoised signal; and
outputting the denoised signal.

* * * * *